March 29, 1960  C. BRYNKO ET AL  2,930,139
VACUUM DRYING
Filed Feb. 6, 1957  2 Sheets-Sheet 1
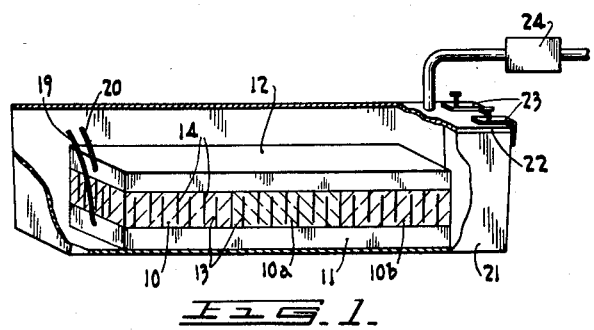
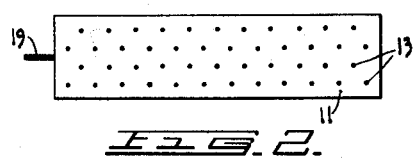
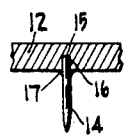 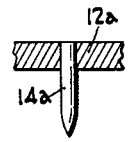 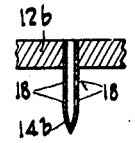
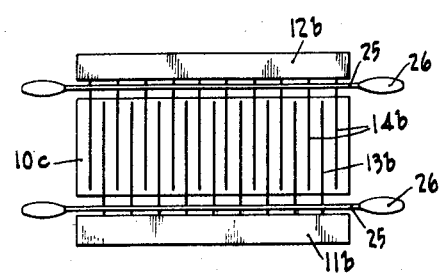
Inventors
Walter R. Smithies
Carl Brynko
by Stevens, Davis, Miller & Mosher
their attorneys

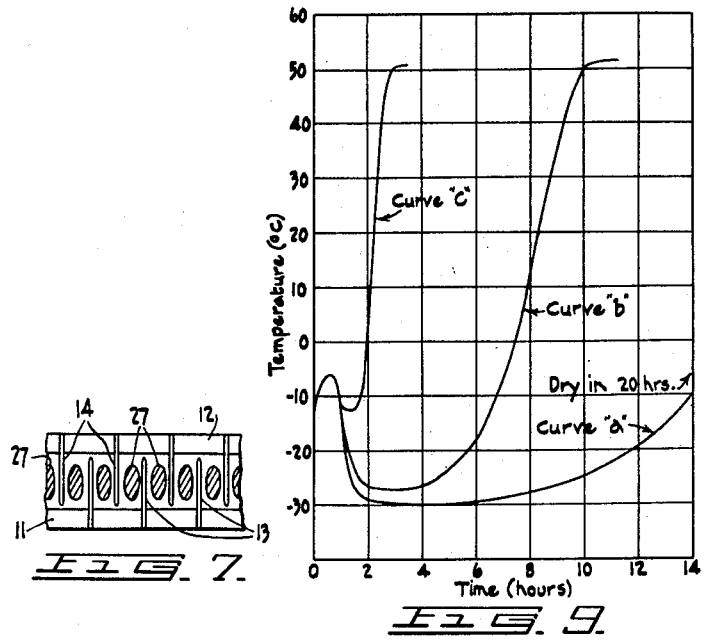
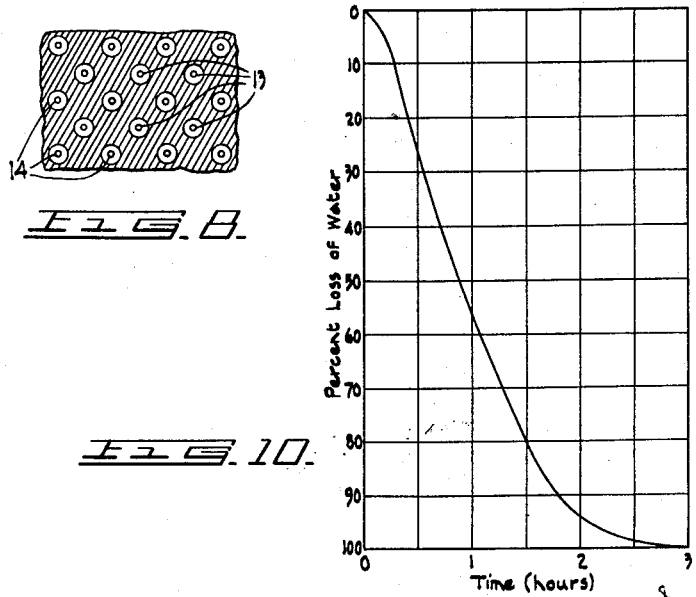

2,930,139
VACUUM DRYING

Carl Brynko, Downsview, Ontario, Canada, and Walter R. Smithies, Toronto, Ontario, Canada, assignors to Her Majesty the Queen in right of Canada as represented by the Minister of National Defence Application February 6, 1957, Serial No. 638,485

Claims priority, application Canada September 11, 1956

6 Claims. (Cl. 34—5)

This invention relates to improvements in the vacuum drying of materials containing water. The invention is particularly applicable to the freeze drying of such materials.

The method of dehydration known as freeze drying or lyophilization has been applied to materials containing water and which are susceptible to heat damage such as biologicals including sera, vaccines, antibodies and the like, and foodstuffs such as fruit juices, meat and vegetables.

The freeze drying process is well known and involves the sublimation of moisture in the frozen state in the material under conditions of high vacuum. The latent heat of sublimation is customarily applied by conduction from plates or shelves which may be heated during the course of the drying. The material being treated is placed on a plate or for more effective heat transfer between plates. During the desiccation the frozen material is progressively dehydrated from its surface to its centre. The ice phase boundary at which sublimation occurs thus recedes from the heated surfaces.

The foregoing procedure suffers from certain disadvantages. The dehydration becomes progressively slower during the desiccation with the consequence that complete dehydration requires a long period of time. This is due mainly to the low thermal conductivity of the desiccated layer separating the ice phase boundary from the heating elements during the latter stages of the desiccation. Another factor is the decreasing surface area of the ice phase boundary. Furthermore, it is difficult to establish satisfactory thermal conduction between the material and the heated plate on which it is laid. A hot plate laid on the top of the material increases the thermal conduction at the risk of impeding escape of water vapour at the surfaces of the material. Excessive pressure of a top plate also may permanently damage the structure of the material. A further disadvantage of the foregoing procedure is that the surface may become damaged or the taste impaired by overheating during the desiccation of the centre. These difficulties are particularly applicable where it is desired to reduce the moisture content to a very low value. A further difficulty arises where substances such as frozen meat are being dried between heated plates in that for maximum permeability the grain of the meat should be perpendicular to the heating element. It is often difficult and inconvenient to cut the meat suitably. Also the meat slices must be of a uniform thickness and the surfaces exactly parallel for efficient conductivity. This also requires careful control during the cutting.

Only thin slices or layers of frozen material can be treated in conventional equipment with the consequence that equipment and handling costs are high. A given amount of product requires a large heating surface. In addition the limited thickness of the material which can be treated decreases the utility of the procedure. It is, for example, desirable to be able to provide meat in the form of steak or roasts with their original physical structure maintained. The roasts may be several inches in thickness and could not economically or effectively be dehydrated in conventional equipment.

Radiant heat has been used in an effort to penetrate the poorly conducting outer layer of material but is difficult to control and of only partial effectiveness. Dielectric heating is expensive and difficulty is experienced in its use at low pressures. The taste of some products such as meat may be impaired.

The object of this invention is to provide an improved method and apparatus for vacuum drying pieces of material containing water.

In accordance with this invention, pieces of frozen material are penetrated by a plurality of metal spikes which preferably are heated by conduction from plates between which the frozen material is placed. The spikes establish good thermal contact with the meat or other material and conduct heat to the difficultly accessible central part. A drying zone is established around each spike increasing the ice phase boundary surface. The pressure on the frozen material due to the heating plates may be small, or if preferred, the plates may be kept out of direct contact with the surface of the material. In this way, escape of moisture is not impeded and darkening of the surface which may occur when plates are in close contact with the material is avoided. The time required for dehydration is lessened, because of the increased thermal conduction from the plates to the core and the increased ice phase boundary surface. The conductivity of the spikes is also advantageous for providing heat to the material for the removal of residual moisture after the evaporation of the ice. When the principles of this invention are used there is a decreased danger of damage to the dehydrated portions of the material. It is not necessary that the material be in the form of thin layers with the consequence that the cost of the procedure is decreased and its field of application is increased. It also is not necessary that the grain of the meat be oriented at right angles to the heated surface.

The water can be either in the frozen or unfrozen state. Thus there can be vacuum freeze drying in which the pressure is maintained below about 3 mm. and initially frozen material will remain frozen while initially unfrozen material will undergo evaporative freezing. The invention is also applicable to reduced pressure drying in which the pressure of the drying chamber may be maintained above 3–4 mm. but generally below 30 mm. Under the latter conditions unfrozen material will remain unfrozen and initially frozen material will thaw.

In the drawings which illustrate the preferred embodiments of this invention:

Figure 1 is a perspective view illustrating one embodiment of this invention;

Figure 2 is a plan view of the bottom plate of the unit shown in Figure 1;

Figures 3 and 4 are detailed views of two types of spikes which may be used in the structure shown in Figures 1 and 2;

Figure 5 is a detail view of a modified type of spike;

Figure 6 is an elevation view of an alternative embodiment of the invention;

Figure 7 is an elevation view of a unit similar to that shown in Figure 1 but illustrating the progression of the desiccation, and Figure 8 is a plan view corresponding to Figure 7;

Figure 9 is a graph showing the results of comparative tests; and

Figure 10 is a graph showing the results of comparative tests.

Referring now to Figures 1 and 2 of the drawings, sections of steak 10, 10a and 10b are placed between lower heating plate 11 and upper heating plate 12 and are impaled on spikes 13 and 14 respectively projecting from plates 11 and 12. Spikes 13 and 14 preferably extend at least to the centre of the steaks 10, 10a and 10b but may with advantage extend to the opposite surface. Upper spikes 14 are staggered with respect to lower spikes 13. Figure 2 illustrates one possible arrangement of spikes 13 but other patterns may be used. Spikes 13 and 14 may be made of any highly conductive material such as stainless steel or for superior heat conduction hardened aluminum and may be of any convenient cross section. The spikes should be of sufficient thickness to avoid a tendency to break or bend and to provide effective conduction and should be spaced sufficiently closely to conduct heat to all parts of the interior of steak 10. The spikes should not however be so large or so close together that they spoil the appearance of the product. For example, wire prongs 1/16" diameter spaced at 3/8" or 1/2" intervals and projecting 1/2" into the steak have been used for the dehydration of steaks 5/8" to 3/4" thick. Aluminum spikes 3/32" diameter and projecting 3/4" have been used with 3/4"-1" thick steaks. Figures 3 and 4 illustrate two ways of securing spikes such as spikes 14 to plate 12. In Figure 3 the upper end 15 of spike 14 is received within a recess 16 which closely engages the upper end of the spike. Spike 14 is secured to plate 12 by weld 17. In Figure 4 the spike 14a is a forced fit in a hole bored through the plate 12a. A modified spike 14b is shown in Figure 5, in this case the spike comprises a hollow tube closed and pointed at its lower end nad communicating at its upper end with the upper surface of plate 12b. The holes 18 bored transversely along its length provide for the escape of water vapor from the interior of the steak. The modification shown in Figure 5 is particularly useful for thick sections of frozen material such as roasts.

Heating plates 11 and 12 are heated in any suitable manner and the heat passes by conduction through spikes 13 and 14. In Figure 1 of the drawings heating plates 11 and 12 are heated by resistance wires 19 and 20 and one or more units comprising heating elements 11 and 12 are placed within an enclosed container having a removable lid 22 secured by clamps 23. An evacuating unit 24 evacuates the interior of container 21.

Figure 6 illustrates a modification in which the steak 10c is supported by spikes 13b and 14b entirely out of contact with plates 11b and 12b. In this construction the heat of sublimation is conducted almost entirely through spikes 13b and 14b whereas in the construction shown in Figure 1 the frozen material is heated by the combined effect of direct conduction from the heating plates and conduction through the spikes. The construction shown in Figure 6 has the advantage that the heating plates do not exert pressure on the meat or close off the pores in the meat, consequently moisture escapes more readily. Figure 5 also illustrates a further modification in that stripper plates 25 having handles 26 or any convenient lever or screw arrangement are provided to assist in removing the dried material from spikes 13b and 14b respectively after dehydration has been completed.

A further modification has been found of value in which the aluminum stripper plates are allowed to be in contact with the surface of the material, although themselves kept out of contact with the heating plates. Holes bored at intervals through the stripper plates allow ready escape of moisture at the surface of the material.

Figures 7 and 8 illustrate the manner in which this invention not only results in conducting heat to the interior of the frozen material but also increases the area of the ice phase boundary at which sublimation occurs. In Figures 7 and 8 the unhatched portion of steak 10d represents the dehydrated layer. The undried frozen portion is cross hatched. The ice phase boundaries are identified by the numeral 27. It will be noted that the contour of the ice phase boundaries 27 are determined by the combined effect of heat transmitted directly from plates 11 and 12 and heat transmitted through spikes 13 and 14. The contour thus provided has an enlarged surface area in comparison with the boundary which would be provided solely by heat transmitted directly from plates 11 and 12 if spikes 13 and 14 were omitted.

The vacuum required for freeze drying in accordance with this invention is generally of the order of 0.05–1.0 mm. of mercury although some materials may be freeze dried at pressures of up to 3 mm. of mercury. The water vapor may be removed by a variety of known methods such as condensation on cold plates held at a temperature below that of the drying material, absorption by a chemical or ejection through the evacuation pump. If the heating plates or stripper plates are in contact with the steak, the pressure on the meat due to the weight of the top plate should not exceed about 0.3 lb. per square inch of meat surface. At higher pressures the plate presents a barrier to escaping vapor.

The freeze-drying process has been carried out in two ways. In the first, the temperature of the meat and heater plates is initially about $-5°$ to $+25°$ C. and the meat is frozen by evaporation under vocuum. Evaporative freezing is a technique frequently used in conventional freeze drying. After freezing has occurred, the plates are heated to a temperature of 40–60° C. to completion of drying. In the second, the meat is frozen and the plates and meat are chilled to $-5°$ to $-30°$ C. before placing in the vacuum chamber. When the pressure has fallen to below 1 mm. mercury, heat is applied as in the first. In the case of meat, the second method gives the higher quality dried product with the better texture and flavor.

Using an apparatus in accordance with this invention, steaks 3/4" thick have been dried to below 2% moisture in 2 to 3½ hours, which is less than half the time required using heated plates not provided with spikes.

A 2½ lb. sirloin roast measuring 5" x 5" x 3" has been dried in about 7 hours between plates fitted with aluminum spikes of 3/32" diameter, 3½" length and spaced ½" apart. It would be practically impossible to dry such a large piece of meat with the use merely of heated plates.

The relative efficiency of processes in which a beefsteak 3/4" thick is dehydrated at a pressure of 0.2 mm. of mercury under various conditions is illustrated by Figure 9.

(a) Steak laid on drying shelf. Initial shelf temperature 25° C., rising to 50° C. after 1½ hours. Initial steak temperature $-15°$ C. Time to reach 50° C., 20 hours.

(b) Steak laid between plates. Initial temperature of plates 25° C. rising to 50° C. after 1½ hours. Initial steak temperature $-15°$ C. Time to reach 50° C., 10 hours.

(c) Steak laid between plates and penetrated by aluminum spikes ½" apart and 3/4" long. Initial temperature of plates $-15°$ C. rising to 50° C. after 30 minutes. Initial steak temperature $-15°$ C. Time to reach 50° C., 3 hours.

Figure 10 illustrates the percentage loss of water with time of a 3/4" steak drying as given under conditions in (c).

The effect of the aluminum spikes in reducing drying times is illustrated by the following figures relating to steak 3/4" thick, dried between plates fitted with spikes 3/4" long and 3/32" diameter.

| Distance between centres of spikes: | Time of drying |
|---|---|
| ¾" | hours 7 |
| ½" | do 2½-3 |
| ⅜" | do 1½-2 |

There is no evidence that meat steaks dried rapidly by means of this invention are inferior in quality to those dried by conventional methods, indeed, quality may be enhanced by the shorter drying time.

We claim:

1. An apparatus for vacuum drying permeable pieces of material containing water comprising an enclosure, means for subjecting material within said enclosure to a vacuum, at least one heating plate in said enclosure, a plurality of spikes extending from said heating plate and adapted to impale said material and to conduct heat into the interior thereof and a stripper plate for removing said material from the heating plate after freeze drying comprising a plate apertured to receive said spikes and located between the heating plate and the material and means for moving the stripper plate in a direction away from the heating plate.

2. A method of vacuum drying permeable pieces of material containing water in the frozen state comprising the steps of penetrating into the interstices of said material at a plurality of points with heat conducting means, subjecting said material to a vacuum and supplying at least part of the latent heat of sublimation of said water to said material by conduction of said plurality of points within the interstices of said material.

3. A method of vacuum drying permeable pieces of material containing water in the frozen state comprising the steps of penetrating into the interstices of said material at a plurality of points with heat conducting means, subjecting said material to a vacuum and supplying part of the latent heat of sublimation of said water to said material to the surfaces thereof and part of said latent heat of sublimation by conduction at said plurality of points within the interstices of said material to establish an ice phase boundary of irregular contour and enlarged surface area.

4. A method as in claim 2 in which said vacuum is maintained below 3 mm. to freeze-dry said material.

5. A method as in claim 2 in which said vacuum is maintained between 3 mm. and 30 mm. to cause water in the unfrozen state to be evaporated.

6. An apparatus for vacuum drying permeable pieces of material containing water comprising an enclosure, means for subjecting material within said enclosure to a vacuum, at least one heating plate in said enclosure and a plurality of spikes extending from said heating plate and adapted to impale said material and to conduct heat into the interior thereof, at least some of said spikes having an open passage communicating between the ends of the spikes which are in the interior of the material and the outer surfaces of said heating plates for the release of water vapor from the interior of said material.

References Cited in the file of this patent

UNITED STATES PATENTS

| 267,535 | Hurd | Nov. 14, 1882 |
| 1,161,603 | Bradshaw | Nov. 23, 1915 |
| 2,103,563 | Sprang | Dec. 28, 1937 |
| 2,292,447 | Irwin | Aug. 11, 1942 |
| 2,351,482 | Campbell | June 13, 1944 |
| 2,585,825 | Nyrop | Feb. 12, 1952 |